United States Patent
Luo et al.

(10) Patent No.: US 11,652,596 B2
(45) Date of Patent: May 16, 2023

(54) METHOD EXECUTED BY USER EQUIPMENT, AND USER EQUIPMENT

(71) Applicants: SHARP KABUSHIKI KAISHA, Sakai (JP); FG Innovation Company Limited, Tuen Mun (HK)

(72) Inventors: Chao Luo, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 96 days.

(21) Appl. No.: 17/054,508

(22) PCT Filed: May 9, 2019

(86) PCT No.: PCT/CN2019/086183
§ 371 (c)(1),
(2) Date: Nov. 10, 2020

(87) PCT Pub. No.: WO2019/214676
PCT Pub. Date: Nov. 14, 2019

(65) Prior Publication Data
US 2021/0194656 A1    Jun. 24, 2021

(30) Foreign Application Priority Data
May 10, 2018 (CN) .......................... 201810445552.1

(51) Int. Cl.
*H04L 5/00*     (2006.01)
*H04W 72/04*    (2009.01)

(52) U.S. Cl.
CPC ......... *H04L 5/0053* (2013.01); *H04W 72/042* (2013.01)

(58) Field of Classification Search
CPC .......................... H04L 5/0053; H04W 72/042
See application file for complete search history.

(56) References Cited

U.S. PATENT DOCUMENTS

| | | | |
|---|---|---|---|
| 2015/0280876 A1 | 10/2015 | You et al. | |
| 2017/0265171 A1 | 9/2017 | Rico Alvarino et al. | |
| 2020/0068608 A1* | 2/2020 | Ye ...................... | H04W 72/048 |

FOREIGN PATENT DOCUMENTS

| | | |
|---|---|---|
| CN | 104780549 | 7/2015 |
| CN | 105409138 | 3/2016 |
| WO | 2020222299 | 11/2020 |

OTHER PUBLICATIONS

Ericsson, PUSCH sub-PRB allocation for MTC, 3GPP TSG-RAN WG1 Meeting #92bis, Sanya, People's Republic of China Feb. 16-Apr. 20, 2018, R1-1804124.

(Continued)

*Primary Examiner* — Elton Williams
(74) *Attorney, Agent, or Firm* — ScienBiziP, P.C.

(57) ABSTRACT

Provided in the present invention is a method executed by user equipment, the method comprising: receiving downlink control information (DCI); determining, according to the DCI, a number of subframes occupied by a physical uplink shared channel (PUSCH) transmission comprising one or more PUSCH repetitions; dividing the one or more PUSCH repetitions into one or more blocks of PUSCH repetitions; and determining a redundancy version index for each of the one of more blocks of PUSCH repetitions, where each of the one or more blocks of PUSCH repetitions comprises at least one PUSCH repetition.

16 Claims, 2 Drawing Sheets

(56) References Cited

OTHER PUBLICATIONS

Ericsson, Qualcomm, "New WID on Even further enhanced MTC for LTE", RP-170732, 3GPP TSG RAN Meeting #75, Dubrovnik, Croatia, Mar. 6-9, 2017.
Ericsson, Qualcomm, "Revised WID on Even further enhanced MTC for LTE", RP-172811, 3GPP TSG RAN Meeting #77, Lisbon, Portugal, Dec. 18-21, 2017.

* cited by examiner

METHOD EXECUTED BY USER EQUIPMENT, AND USER EQUIPMENT

TECHNICAL FIELD

The present invention is related to the field of wireless communications technologies, and specifically, to a method executed by user equipment, a method performed by a base station, and corresponding user equipment.

BACKGROUND

A new work item on even further enhancement of machine type communication (MTC) was approved at the 3rd Generation Partnership Project (3GPP) RAN #75 plenary meeting held in March 2017 (see non-patent literature: RP-170732: New work item description (WID) on even further enhanced MTC for Long-term Evolution (LTE), efeMTC for short, and RP-172811 updated in December 2017: Revised WID on even further enhanced MTC for LTE). One of the goals of the efeMTC is to support resource allocation based on sub-physical resource blocks (sub-PRBs) (specifically support resource allocation based on less than one PRB) so as to improve the spectral efficiency of an MTC physical uplink shared channel.

In the existing 3GPP standard specifications related to MTC, MTC user equipment (UE) (also referred to as BL/CE UE) in a radio resource control (RRC) connected state supports two coverage enhancement modes: a coverage enhancement (CE) mode A (CE mode A) and a coverage enhancement mode B (CE mode B). The coverage enhancement mode A is applicable to a UE having good channel conditions, requiring no or minimal coverage enhancement, and requiring no or very few repeated transmissions. The coverage enhancement mode B is applicable to a UE having poor channel conditions, requiring large or quite large coverage enhancement, or requiring many or quite many repeated transmissions.

In the existing 3GPP standard specifications related to MTC, the coverage of a physical uplink shared channel (PUSCH) is expanded by repeated transmission. When a UE obtains a maximum value of a repeated transmission number of a PUSCH (for CE mode A, a parameter pusch-maxNumRepetitionCEmodeA is used; for CE mode B, a parameter pusch-maxNumRepetitionCEmodeB is used) by receiving RRC signaling from an eNB, where a repeated transmission number set of the PUSCH may be known as follows from the maximum value: $\{n_1, n_2, \ldots, n_{max}\}$ (for the coverage enhancement mode A, the size of the set is 4, that is, $n_{max}=n_4$; for the coverage enhancement mode B, the size of the set is 8, that is, $n_{max}=n_8$). For example, if pusch-maxNumRepetitionCEmodeA=16, then the PUSCH repeated transmission number set is {1, 4, 8, 16}; if pusch-maxNumRepetitionCEmodeB=256, then the PUSCH repeated transmission number set is {4, 8, 16, 32, 64, 128, 192, 256}.

Uplink data transmission of the UE is scheduled by downlink control information (DCI) transmitted by the eNB. A "repetition number" field in the DCI indicates a repeated transmission number used in this PUSCH transmission.

In the existing 3GPP standard specifications related to MTC, a subframe is a unit of PUSCH repeated transmission After receiving a transport block (TB, a size of which is referred to as a Transport block size (TBS)) from a higher-layer entity, a physical layer entity of the UE performs operations such as channel coding, rate matching, scrambling, modulation, discrete Fourier transform (DFT) pre-coding, and antenna mapping on the transport block, and then maps generated output to allocated time-frequency resources. The time-frequency resources are allocated with a resource block pair (RB pair) as a unit, where one resource block pair occupies one subframe (for example, a total of 14 OFDM symbols in a normal cyclic prefix). When more than one resource block pair is allocated, these allocated resource block pairs have different frequency resources, but all are included in the same subframe. When the repetition number of a PUSCH is equal to 1, it may be assumed that one repetition is transmitted on allocated PUSCH subframes. When the repetition number of the PUSCH is greater than 1, it may be assumed that one repetition is transmitted on each allocated PUSCH subframe.

In the existing 3GPP standard specifications related to MTC, BL/CE subframes and non-BL/CE subframes are distinguished in both uplink and downlink. For example, in the uplink, a PUSCH may be transmitted only on a BL/CE uplink subframe, and in case of a non-BL/CE uplink subframe, the transmission of the PUSCH is delayed until a BL/CE uplink subframe reappears. For example, if subframes n, n+1, n+3, n+4 are BL/CE uplink subframes, and a subframe n+2 is a non-BL/CE uplink subframe, then a PUSCH transmission (assume the repetition number is 4) starting from the subframe n occupies the subframes n, n+1, n+3, n+4. Moreover, the PUSCH transmission spans the five subframes n, n+1, n+2, n+3, and n+4.

BL/CE uplink subframes and BL/CE downlink subframes may be separately configured via a higher-layer protocol.

In the existing 3GPP standard specifications related to MTC, the smallest resource allocation unit for a PUSCH is one physical resource block (PRB), specifically occupying a bandwidth of 12 subcarriers in the frequency domain (the subcarrier spacing is 15 kHz, and the physical bandwidth of one PRB is 180 kHz). When UE has poor channel conditions, in order to achieve the desired reception quality for a PUSCH, available methods include increasing the transmit power of the UE or increasing the repeated transmission number of the PUSCH. However, the UE has a transmit power limit or a maximum transmit power. For an MTC UE having poor channel conditions or poor coverage, existing LTE systems already use the maximum transmit power. Research shows that for a UE with poor coverage, link performance of a PUSCH may be effectively improved and uplink spectral efficiency may be enhanced by reducing the resource allocation bandwidth (for example, changing the granularity of resource allocation from 12 subcarriers to 6 subcarriers or even 3 subcarriers or 1 subcarrier) and increasing power per unit frequency. This is known as "sub-PRB" resource allocation.

The concept of a resource unit (RU) is introduced along with the "sub-PRB" resource allocation. One RU occupies x subcarriers in the frequency domain and occupies y subframes in the time domain. For example, the following types of RU formats may be defined as:

| Number of subcarriers (x) | Number of subframes (y) | Modulation mode |
|---|---|---|
| 6 | 2 | QPSK |
| 3 | 4 | QPSK |
| 2(*) | 8 | Pi/2 BPSK |

* Three subcarriers are allocated, but only two adjacent subcarriers thereof are used In all the RU disclosed formats, even if only one RU is allocated, the time exceeds one subframe. Since one RU has fewer resources in the frequency domain, allocation of a plurality of RUs is often allowed during resource allocation. For example, 1, 2, or 4 RUs may be allocated for an MTC UE configured in CE mode A, and 2 or 4 RUs may be allocated for an MTC UE configured in CE mode B.

In the case of sub-PRB resource allocation, one transport block is subjected to a series of operations such as channel coding and then mapped to one or a plurality of allocated RUs, and then repeatedly transmitted (when the repetition number is equal to 1, it may also be assumed that no repetition exists). For example, an RU format allocated to a UE for a PUSCH transmission is 6 subcarriers/2 subframes/QPSK modulation, an RU number is 2, and a repetition number is 8 such that one PUSCH repetition occupies 4 subframes, and the entire PUSCH transmission occupies a total of 32 subframes.

In the existing 3GPP standard specifications related to MTC, a method for determining a redundancy version of a PUSCH of an MTC UE is as follows: Subframes in a system (e.g. the system has 1024 radio frames, each radio frame has 10 subframes, thus a total of 1024×10=10240 subframes exist) are serially numbered starting from 0 (e.g. from 0 to 10239), and these subframes are divided into a series of blocks of subframes, where each block of subframes includes $N_{acc}$ consecutive subframes, and a starting subframe serial number ($n_{abs,1}$) of each block of subframes satisfies $n_{abs,1}$ mod $N_{acc}$=0. A first uplink subframe serial number of the PUSCH is denoted as $i_0$, and a PUSCH transmission spans $N_{abs}^{PUSCH}$ consecutive subframes (including non-BL/CE uplink subframes). During this period (specifically in the $N_{abs}^{PUSCH}$ consecutive subframes), for subframes in a jth block of subframes spanned by the PUSCH, an index of the redundancy version rv=(j+$rv_{DCI}$) mod 4, where j=0, 1, . . . , $J^{PUSCH}$−1, and $$J^{PUSCH} = \left\lceil \frac{N_{abs}^{PUSCH} + (i_0 \bmod N_{acc})}{N_{acc}} \right\rceil.$$

The $J^{PUSCH}$ blocks of subframes are sequentially arranged in time, starting from j=0 (specifically, a block of subframes to which the subframe $i_0$ belongs).

For an MTC UE configured in a CE mode A, $rv_{DCI}$ is determined by a redundancy version field in a DCI format 6-0A; $N_{acc}$=1.

For an MTC UE configured in a CE mode B, $rv_{DCI}$=0; for FDD (Frequency Division Duplex), $N_{acc}$=4; for TDD (Time Division Duplex), $N_{acc}$=5.

The redundancy version ($rv_{idx}$) is determined through the relationship between rv and $rv_{idx}$ in the following table:

| Redundancy version index | |
|---|---|
| rv | $rv_{idx}$ |
| 0 | 0 |
| 1 | 2 |
| 2 | 3 |
| 3 | 1 |

In the existing MTC standard specifications, two consecutive PUSCH subframes may use different redundancy versions. This applies to the situation where one PUSCH repetition occupies one subframe, but does not apply to the situation where one PUSCH repetition occupies more than one subframe. For example, in the case of sub-PRB resource allocation, one PUSCH repetition may occupy 8 subframes, while one PUSCH repetition can only apply one redundancy version. AA new method for determining a redundancy version is needed.

In addition, in the existing 3GPP LTE standard specifications, for a non-MTC UE (also referred to as non-BL/CE UE), a common resource allocation mode for a physical downlink shared channel (PDSCH) is downlink resource allocation type 0 (DL resource allocation type 0). That is, resource block allocation information (generally indicated via a resource block assignment field in downlink control information (DCI)) includes a bitmap, where each bit indicates whether a specific resource block group (RBG) is allocated to a scheduled user equipment (UE). One RBG includes a group of consecutive virtual resource blocks (VRBs) of a localized type, and the virtual resource blocks of the localized type are directly mapped to physical resource blocks (PRBs). For example, a virtual resource block 0 is directly mapped to a physical resource block 0, and a virtual resource block 1 is directly mapped to a physical resource block 1. RBG sizes in different downlink system bandwidths may be seen in the following table, where the system bandwidth $N_{RB}^{DL}$ and the RBG size P both have PRB as the unit; and the serial number of the PRB in the system is $n_{PRB}$=0,1, . . . , $N_{RB}^{DL}$−1.

RBG Sizes in Different Downlink System Bandwidths

| System bandwidth $N_{RB}^{DL}$ | RBG size (P) |
|---|---|
| <10 | 1 |
| 11-26 | 2 |
| 27-63 | 3 |
| 64-110 | 4 |

The bitmap includes a total of $N_{RBG}^{DL}=\lceil N_{RB}^{DL}/P \rceil$ bits, each bit corresponding to 1 RBG. If the downlink system bandwidth is 25 resource blocks (RBs), the following applies: the RBG size P=2, and a total number of RBGs is $N_{RBG}^{DL}=\lceil N_{RB}^{DL}/P \rceil=\lceil 25/2 \rceil=13$, where the size of each RBG in the first 12 RBGs is 2 RBs, and the size of the last RBG is 1 RB.

For an RBG serially numbered as $n_{RBG}$, the serial number of a starting PRB occupied by the RBG is as follows:

$$n_{RBG} \cdot P \qquad (1)$$

where $n_{RRB}$=0, 1, . . . , $N_{RBG}^{DL}$−1.

If the value of each subsequent bit of the bitmap is 101 111 010 001 0, then allocated RBGs are RBG0, RBG2, RBG3, RBG4, RBG5, RBG7, RBG11.

In the existing 3GPP standard specifications related to MTC, an MTC UE (also referred to as BL/CE UE) in an RRC connected state supports two coverage enhancement modes: a coverage enhancement mode A (CE mode A) and a coverage enhancement mode B (CE mode B). The coverage enhancement mode A is applicable to UE having good channel conditions, requiring no or minimal coverage enhancement, and requiring no or very few repeated transmissions. The coverage enhancement mode B is applicable to UE having poor channel conditions, requiring large or quite large coverage enhancement, or requiring many or quite many repeated transmissions.

Depending on the capability of an MTC UE, some UE only supports a PDSCH bandwidth of 1.4 MHz, some UE supports a PDSCH bandwidth of 5 MHz, while some UE supports a PDSCH bandwidth of 20 MHz. The UE supporting the PDSCH bandwidth of 5 MHz may also be configured with a maximum PDSCH bandwidth of 1.4 MHz, and the UE supporting the PDSCH bandwidth of 20 MHz may also be configured with the maximum PDSCH bandwidth of 5 MHz or 1.4 MHz. The scheme of the present invention is illustrated below by using the maximum PDSCH bandwidth being configured as 1.4 MHz as an example, but the scheme of the present invention also partially or fully applies to other maximum PDSCH bandwidth configurations.

MTC UE generally uses frequency resources in the system with one or a plurality of narrowbands (NBs) as a unit. One NB includes 6 consecutive non-overlapping physical resource blocks. For a specific downlink system bandwidth $N_{RB}^{DL}$, a total of $$N_{NS}^{DL} = \left\lfloor \frac{N_{RB}^{DL}}{2} \right\rfloor$$

downlink NBs exist, which are serially numbered as $n_{NB}=0, 1, \ldots, N_{NB}^{DL}-1$. For an NB serially numbered as $n_{NB}$, the serial number of 6 physical resource blocks occupied by the NB may be represented as:

$$\begin{cases} 6n_{NB}+i_0+i & \text{if } N_{RB}^{DL} \bmod 2 = 0 \\ 6n_{NB}+i_0+i & \text{if } N_{RB}^{DL} \bmod 2 = 1 \text{ and } n_{NB} < N_{NB}^{DL}/2 \\ 6n_{NB}+i_0+i+1 & \text{if } N_{RB}^{DL} \bmod 2 = 1 \text{ and } n_{NB} \geq N_{NB}^{DL}/2 \end{cases} \quad (2)$$

where $$i = 0, 1, \ldots, 5, \; i_0 = \left\lfloor \frac{N_{RB}^{DL}}{2} \right\rfloor - \frac{6N_{NB}^{DL}}{2},$$

and mod is a remainder operator.

If the downlink system bandwidth is 25 resource blocks, a correspondence between PRBs, RBGs, and NBs is as shown in FIG. 2.

For an MTC UE in a coverage enhancement mode A, steps of PDSCH resource allocation thereof are as follows:
1. In resource block allocation information, $\lceil \log_2 \lfloor N_{RB}^{DL}/6 \rfloor \rceil$ bits are used to carry an NB serial number $n_{NB}$;
2. In resource block allocation information, another 5 bits are used to carry a resource indication value (RIV), and a downlink resource allocation type 2 (DL resource allocation type 2) is used for resource allocation for resources in the indicated NB. At this time, it is always assumed that $N_{RB}^{DL}=6$, $N_{VRB}^{DL}=6$, regardless of the actual system bandwidth.

In the downlink resource allocation type 2, the value of each RIV corresponds to a starting resource block ($RB_{start}$) and a length of a group of consecutively allocated virtual resource blocks ($L_{CRBs}$). In allocation of PDSCH resources to the MTC UE in the coverage enhancement mode A, a reference PRB of $RB_{start}$, i.e., a PRB corresponding to $RB_{start}=0$, is a first PRB in the indicated NB (specifically the PRB corresponding to i=0 in expression (2). The serial number of the PRB in the NB is generally 0, so the PRB may also be called the 0th PRB in the NB. The first PRB in an RBG is also called similarly in the present invention, that is, the PRB is serially numbered as 0 in the RBG, and may also be sometimes called the 0th PRB in the RBG).

A correspondence between the RIV and $RB_{start}$ and $L_{CRBs}$ is as follows:

If $(L_{CRBs}-1) \leq \lfloor N_{RB}^{DL}/2 \rfloor$ then $$RIV = N_{RB}^{DL}(L_{CRBs}+1)+RB_{start}$$

Else $$RIV = N_{RB}^{DL}(N_{RB}^{DL}-L_{CRBs}+1)+(N_{RB}^{DL}-1-RB_{start})$$

where $0 \leq RB_{start} \leq N_{VRB}^{DL}-1$, $1 \leq L_{CRBs} \leq N_{VRB}^{DL}-RB_{start}$ If the downlink system bandwidth is 25 resource blocks, if the indicated NB serial number is 2 (i.e., NB index=2), and the indicated RIV value is 14, then the UE may derive the following according to the indicated RIV value: $RB_{start}=2$ and $L_{CRBs}=3$. As shown in FIG. 3, resources allocated to the UE are PRB15, PRB16, and PRB17.

The PDSCH allocated to the MTC UE may also be configured to perform frequency hopping. The following parameters related to frequency hopping are configured by a base station via RRC signaling as follows:
mpdcch-pdsch-HoppingConfig: indicating, by an RRC layer, whether frequency hopping is activated.
mpdcch-pdsch-HoppingNB-r13: indicating the number of NBs used for frequency hopping.
interval-DLHoppingConfigCommonModeX: indicating that PDSCHs of UE in CE mode X (X is A or B) remain in the same NB on a specific number of subframes.
mpdcch-pdsch-HoppingOffset: indicating an offset (with an NB as a unit) between two consecutive NBs in which frequency hopping is performed.

For an MTC UE in CE mode A, the frequency hopping of the PDSCH is further controlled by a frequency hopping marker included in DCI. That is, the PDSCH performs frequency hopping only when the RRC parameter mpdcch-pdsch-HoppingConfig indicates activating frequency hopping and the frequency hopping marker in the DCI also indicates frequency hopping.

Due to the difference between PDSCH resource allocation modes for a non-MTC UE and an MTC UE in the LTE system disclosed previously, when a non-MTC UE and an MTC UE coexist in the system, the efficiency of resource allocation may be relatively low. If NB2 covers the entirety of RBG7 and RBG8 and part of RBG6 and RBG9 and a specific piece of an MTC UE is allocated with all 6 PRBs of NB2, then none of RBG6, RBG7, RBG8, and RBG9 may be used for a non-MTC UE (if a downlink resource allocation type 0 is used), though PRB12 included in RBG6 and PRB19 included in RBG9 are both idle.

Therefore, a new resource allocation mechanism is needed to better improve the resource allocation efficiency when different types of UE are used together.

SUMMARY

In order to solve at least some of the previously disclosed problems in the prior art, the present invention provides a method executed by user equipment and user equipment, which can efficiently determine a redundancy version of a PUSCH in sub-PRB resource allocation.

According to the present invention, a method executed by user equipment UE) for improving resource allocation efficiency when different types of UE are used together is provided, the method comprising: receiving downlink control information (DCI); determining, according to the DCI, a number of subframes occupied by a physical uplink shared channel (PUSCH) transmission comprising one or more PUSCH repetitions; dividing the one or more PUSCH repetitions into one or more blocks of PUSCH repetitions; and determining a redundancy version index for each of the one of more blocks of PUSCH repetitions, where each of the one or more blocks of PUSCH repetitions comprises at least one PUSCH repetition.

Preferably, each of the one of more PUSCH repetitions is allocated with one or more resource units, each of the one of more resource units occupying one or more subframes.

Preferably, the number of subframes occupied by the PUSCH transmission is determined according to a number of PUSCH repetitions, a number of resource units allocated to each of the one of more PUSCH repetitions, and a number of subframes occupied by each of the one of more resource units.

Preferably, the redundancy version index of each of the one of more blocks of PUSCH repetitions is determined according to a serial number of the corresponding block of PUSCH repetitions.

In addition, according to the present invention, a method executed by user equipment (UE) for improving resource allocation efficiency when different types of UE are used together is provided, the method comprising: receiving downlink control information (DCI); determining, according to the DCI, a number of subframes occupied by a physical uplink shared channel (PUSCH) transmission comprising one or more PUSCH repetitions; dividing the one or more PUSCH repetitions into one or more blocks of PUSCH repetitions; determining a reference subframe for each of the one of more blocks of PUSCH repetitions; and determining a redundancy version index for each reference subframe to serve as a redundancy version index of a block of the one of more PUSCH repetitions in which the reference subframe is located, where each of the one or more blocks of PUSCH repetitions comprises at least one PUSCH repetition.

Preferably, each of the one of more PUSCH repetitions is allocated with one or more resource units; and each of the one of more resource units occupies one or more subframes.

Preferably, the number of subframes occupied by the PUSCH transmission is determined according to a number of PUSCH repetitions, a number of resource units allocated to each of the one of more PUSCH repetitions, and a number of subframes occupied by each of the one of more resource units.

Preferably, the redundancy version index of each reference subframe is determined according to a serial number of a block of subframes in which the reference subframe is located.

In addition, according to the present invention, user equipment (UE) for improving resource allocation efficiency when different types of UE are used together is provided, the UE comprising: a processor; and a memory, storing instructions, when the processor executes the instructions perform the method disclosed previously.

In addition, according to the present invention, user equipment (UE) for improving resource allocation efficiency when different types of UE are used together, the UE comprising: a processor; and a memory, storing instructions, wherein when the processor executes the instructions perform the method disclosed previously.

According to the present invention, a redundancy version of a PUSCH may be efficiently determined in sub-PRB resource allocation.

In addition, according to the present invention, a method executed by user equipment is provided, the method comprising: receiving downlink control information (DCI) from a base station, wherein the downlink control information (DCI) comprises resource block allocation information; determining a starting resource block $RB_{start}$ and a length $L_{CRBs}$ of a group of consecutively allocated resource blocks starting from the starting resource block through the resource block allocation information; and receiving a physical downlink shared channel (PDSCH) on resource blocks determined by the starting resource block $RB_{start}$ and the length $L_{CRBs}$ of the resource blocks, wherein the resource block allocation information comprises a resource indication value (RIV) corresponding to an intermediate variable RIV', and the intermediate variable RIV' corresponds to the starting resource block $RB_{start}$ and the length $L_{CRBs}$ of the resource blocks.

Preferably, a correspondence between the intermediate variable RIV' and the starting resource block $RB_{start}$ and the length $L_{CRBs}$ of the resource blocks may be represented in a table.

Preferably, different tables for describing a correspondence between the intermediate variable RIV' and the starting resource block $RB_{start}$ and the length $L_{CRBs}$ of the resource blocks may be defined for different downlink system bandwidths $N_{RB}^{DL}$.

According to the present invention, the efficiency of resource allocation may be greatly improved.

BRIEF DESCRIPTION OF THE DRAWINGS

The above and other features of the present invention will become more apparent from the following detailed description taken in conjunction with the accompanying drawings, in which.

DETAILED DESCRIPTION

The present invention will be subsequently disclosed in detail with reference to the accompanying drawings and specific embodiments. It should be noted that the present invention should not be limited to the specific disclosed embodiments. In addition, for the sake of brevity, detailed disclosure of well-known technologies that are not directly associated with the present invention are omitted to prevent confusion in the understanding of the present invention.

A plurality of embodiments according to the present invention are specifically disclosed subsequently by using an LTE mobile communication system and its evolved version as an exemplary application environment. However, the present invention is not limited to the disclosed embodiments, but may be applied to additional wireless communication systems, such as a 5G mobile communication system and a mobile communication system later than 5G.

Some terms related to the present invention are disclosed subsequently. If not specifically indicated, the terms related to the present invention take the definitions disclosed herein. The disclosed terms may be different in LTE, LTE-Advanced, LTE-Advanced Pro, 5G, and later communication systems, but unified terms are used in the present invention.

When applied to a specific system, the terms may be replaced with terms used in the corresponding system.

Embodiment 1

Figure 1:
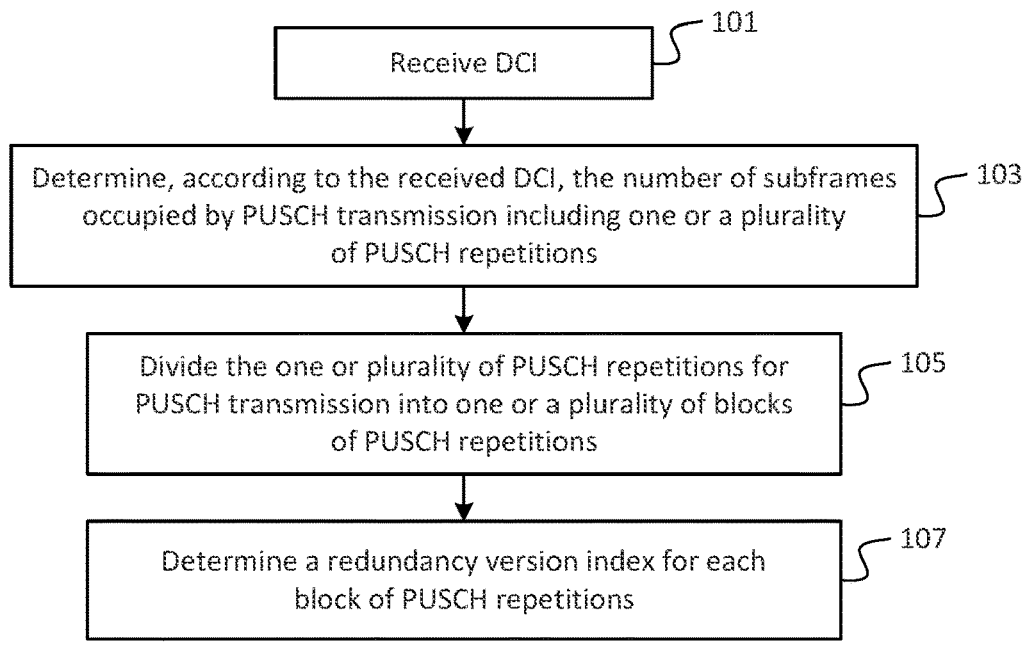
FIG. 1 illustrates a flowchart of a method executed by user equipment according to an embodiment of the present invention.

FIG. 1 illustrates a flowchart of a method executed by user equipment according to an embodiment of the present invention.

As illustrated in FIG. 1, steps executed by the user equipment (UE) include:

Step 101: receive downlink control information (DCI) from, for example, a base station.

Step 103: determine, according to the received DCI, the number N of subframes occupied by a physical uplink shared channel (PUSCH) transmission including one or a plurality of PUSCH repetitions.

For example, for a repetition number R, the number $N_{RU}$ of allocated resource units, and the number $N_t^{RU}$ of subframes occupied by each resource unit may be determined according to the DCI, and then N is calculated using the following equation:

$$N = R \cdot N_{RU} \cdot N_t^{RU}$$

Step 105: divide the one or plurality of (for example, R) PUSCH repetitions included in the PUSCH transmission into one or a plurality of blocks of PUSCH repetitions, where each of the one or plurality of blocks of PUSCH repetitions includes at least one PUSCH repetition.

For example, starting from the first PUSCH repetition of the PUSCH transmission, every C consecutive PUSCH repetitions are grouped into one block of PUSCH repetitions, and the PUSCH transmission includes a total of ⌈R/C⌉ blocks of PUSCH repetitions, where C is a positive integer. The blocks of PUSCH repetitions may be serially numbered in time order, where the first block of PUSCH repetitions is serially numbered as 0.

Optionally, C may be a predefined value. For example, C=1. When C=1, it may also be assumed that the definition of blocks of PUSCH repetitions does not exist; at this time, one block of PUSCH repetitions is equivalent to one PUSCH repetition.

Optionally, the value of C may be different for CE mode A and CE mode B.

Optionally, the value of C may be configured via RRC parameters.

Step 107: determine a redundancy version index for each block of PUSCH repetitions, then determine a redundancy version according to the redundancy version index, and use the redundancy version as the same redundancy version used by all PUSCH repetitions in the block of PUSCH repetitions.

For example, a redundancy version index rv corresponding to a block of PUSCH repetitions serially numbered as b (the value of b may be 0, 1, ..., ⌈R/C⌉−1) may be a function of b, for example, may be calculated using the following equation:

$$rv = (b + rv_{DCI}) \bmod 4$$

A correspondence between the redundancy version index rv and a redundancy version $rv_{idx}$ may be as follows:

| Redundancy version index rv | $rv_{idx}$ |
|---|---|
| 0 | 0 |
| 1 | 2 |
| 2 | 3 |
| 3 | 1 |

The value of $rv_{DCI}$ may be as follows:

For an MTC UE configured in CE mode A, $rv_{DCI}$ is determined by a redundancy version field in a DCI format 6-0A.

For an MTC UE configured in CE mode B, $rv_{DCI}=0$.

Afterwards, transmission of PUSCH repetitions that use the corresponding redundancy version may be performed.

Embodiment 2

Figure 2:
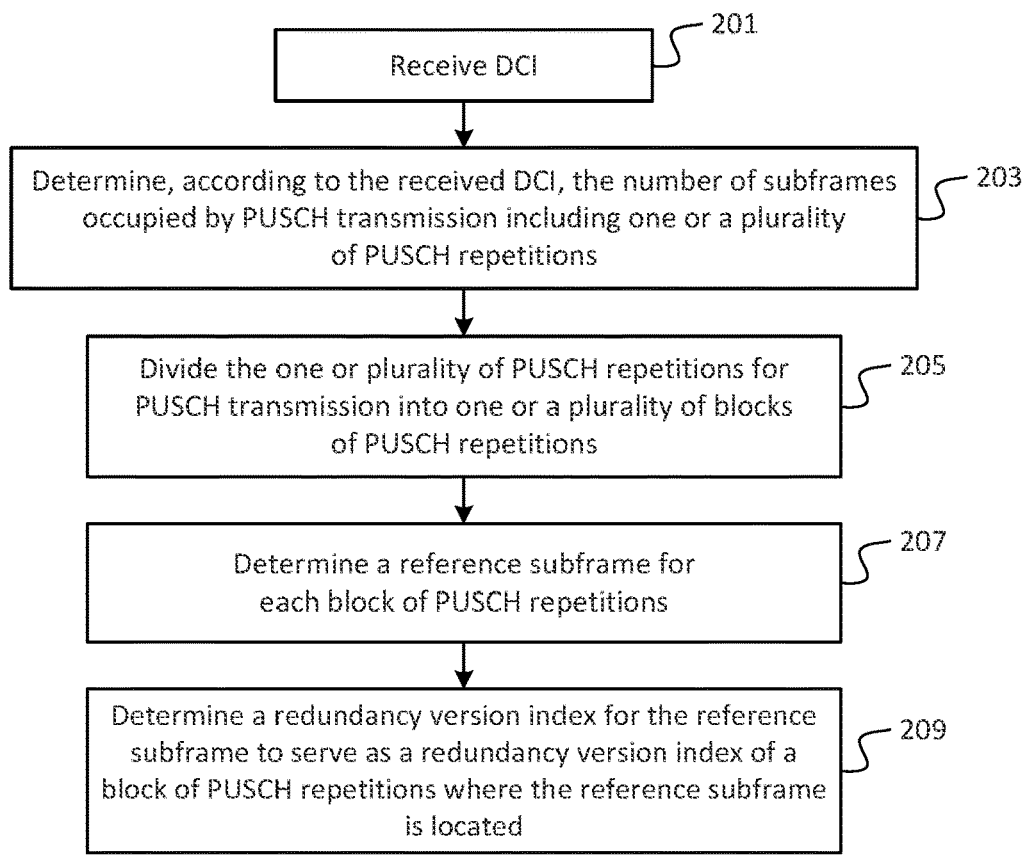
FIG. 2 illustrates a flowchart of a method executed by user equipment according to an embodiment of the present invention.

FIG. 2 illustrates a flowchart of a method executed by user equipment according to an embodiment of the present invention.

As illustrated in FIG. 2, steps executed by the user equipment (UE) include:

Step 201: receive downlink control information (DCI) from, for example, a base station.

Step 203: determine, according to the received DCI, the number N of subframes occupied by physical uplink shared channel (PUSCH) transmission including one or a plurality of PUSCH repetitions.

For example, a repetition number R, the number $N_{RU}$ of allocated resource units, and the number $N_t^{RU}$ of subframes occupied by each resource unit may be determined according to the DCI, and then N is calculated using the following equation:

$$N = R \cdot N_{RU} \cdot N_t^{RU}$$

Step 205: divide the one or plurality of (for example, R) PUSCH repetitions included in the PUSCH transmission into one or a plurality of blocks of PUSCH repetitions, where each of the one or plurality of blocks of PUSCH repetitions includes at least one PUSCH repetition.

For example, starting from the first PUSCH repetition of the PUSCH, every C consecutive PUSCH repetitions are grouped into one block of PUSCH repetitions, and the PUSCH transmission includes a total of ⌈R/C⌉ blocks of PUSCH repetitions, where C is a positive integer. The blocks of PUSCH repetitions may be serially numbered in time order, where the first block of PUSCH repetitions is serially numbered as 0.

Optionally, C may be a predefined value. For example, C=1. When C=1, it may also be assumed that the definition of blocks of PUSCH repetitions does not exist; at this time, one block of PUSCH repetitions is equivalent to one PUSCH repetition.

Optionally, the value of C may be different for CE mode A and CE mode B.

Optionally, the value of C may be configured via RRC parameters.

Step 207: determine a reference subframe for each block of PUSCH repetitions, that is, determine a reference subframe corresponding to each block of PUSCH repetitions.

Optionally, the reference subframe may be the first PUSCH subframe in the block of PUSCH repetitions. For example, in FDD, if the last subframe of an MTC physical downlink control channel (MPDCCH) carrying the DCI is a subframe n, the PUSCH transmission may occupy subframes $n+k_i$, i=0, 1, ..., N−1, where:

$$4 \leq k_0 < k_1 < \ldots < k_{N-1}.$$

The subframes n+$k_i$, i=0, 1, . . . , N−1 are N consecutive BL/CE uplink subframes starting from a subframe n+4. These N subframes may be referred to as N PUSCH subframes occupied by the PUSCH transmission.

At this time, a reference subframe corresponding to a block of PUSCH repetitions serially numbered as b (the value of b may be 0, 1, . . . , ⌈R/C⌉−1) may be the first PUSCH subframe in the block of PUSCH repetitions, specifically a subframe n+$k_s$, where s=b·C·$N_{RU}$·$N_t^{RU}$.

Optionally, the reference subframe may be the last PUSCH subframe in the block of PUSCH repetitions.

Optionally, the reference subframe may be a subframe with a definite serial number in the block of PUSCH repetitions. For example, a subframe serially numbered as 4 (assuming that the subframe serial number in the block of PUSCH repetitions starts from 0). The subframe with the definite serial number may include only PUSCH subframes, or may include only subframes not transmitting the PUSCH (such as non-BL/CE subframes spanned by the block of PUSCH repetitions), or may include both PUSCH subframes and subframes not transmitting the PUSCH.

Optionally, the reference subframe may be a subframe in the block of PUSCH repetitions that is determined according to a preset function. Input parameters of the function may include the repetition serial number b of the block of PUSCH repetitions. One subframe in the block of PUSCH repetitions may include only PUSCH subframes, or may include only subframes not transmitting the PUSCH (for example, non-BL/CE subframes spanned by the block of PUSCH repetitions), or may include both PUSCH subframes and subframes not transmitting the PUSCH.

Step 209: for each block of PUSCH repetitions, determine a redundancy version index for the reference subframe to serve as a redundancy version index of a block of PUSCH repetitions where the reference subframe is located, then determine a redundancy version according to the redundancy version index, and use the determined redundancy version as a redundancy version of the block of PUSCH repetitions, specifically the same redundancy version used by all PUSCH repetitions in the block of PUSCH repetitions.

For example, the redundancy version corresponding to the reference subframe that correspond to the block of repetitions may be determined using the following method:

subframes in a system (for example, the system has 1024 radio frames and each radio frame has 10 subframes; then, a total of 1024×10=10240 subframes exist) are serially numbered starting from 0 (for example, from 0 to 10239), and these subframes are divided into a series of blocks of subframes, where each block of subframes includes $N_{acc}$ consecutive subframes (with the possible exception of the last block of subframes, where the block of subframes may include fewer than $N_{acc}$ consecutive subframes), and a starting subframe serial number (denoted as $n_{abs,1}$) of each block of subframes satisfies $n_{abs,1}$ mod $N_{acc}$=0.

A first uplink subframe serial number of the PUSCH is denoted as $i_0$, and a PUSCH transmission spans $N_{abs}^{PUSCH}$ consecutive subframes (including non-BL/CE uplink subframes). If the reference subframe corresponding to the block of PUSCH repetitions belongs to a jth block of subframes, a redundancy version index corresponding to the reference subframe corresponding to the block of PUSCH repetitions may be a function of j, for example, may be calculated through the following equation:

$$rv = (j + rv_{DCI}) \bmod 4$$

where
j=0, 1, . . . , $J^{PUSCH}$−1, and $$J^{PUSCH} = \left\lceil \frac{N_{abs}^{PUSCH} + (i_0 \bmod N_{acc})}{N_{acc}} \right\rceil,$$

the $J^{PUSCH}$ blocks of subframes are sequentially arranged in time, starting from j=0. The block of subframes corresponding to j=0 may be a block of subframes to which the subframe $i_0$ belongs, and the jth block of subframes may be a jth block of subframes in the $N_{abs}^{PUSCH}$ consecutive subframes.

Optionally, for an MTC UE configured in a CE mode A, $rv_{DCI}$ is determined by a redundancy version field in a DCI format 6-0A.

Optionally, for an MTC UE configured in a CE mode B, $rv_{DCI}$=0.

Optionally, the redundancy version ($rv_{idx}$) is determined via the relationship between rv and $rv_{idx}$ shown in the following table:

| Redundancy version index rv | $rv_{idx}$ |
|---|---|
| 0 | 0 |
| 1 | 2 |
| 2 | 3 |
| 3 | 1 |

Optionally, the value of $N_{acc}$ may be configured via RRC parameters.

Optionally, $N_{acc}$ may be a function of C·$N_{RU}$·$N_t^{RU}$, or a function of $N_{RU}$·$N_t^{RU}$. For example, $N_{acc}$ may be determined via the following equation:

$$N_{acc} = P \cdot C \cdot N_{RU} \cdot N_t^{RU}$$

where P is a positive integer.
Optionally, P may be a predefined value.
Optionally, the value of P may be different for CE mode A and CE mode B.
Optionally, the value of P may be configured via RRC parameters.
Optionally, the value of P may be as follows:
  for an MTC UE configured in CE mode A, P=1.
  For an MTC UE configured in CE mode B, for FDD, P=4; for TDD, P=5.

After the redundancy version is determined, transmission of PUSCH repetitions that use the corresponding redundancy version may be performed.

Embodiment 3

Figure 3:
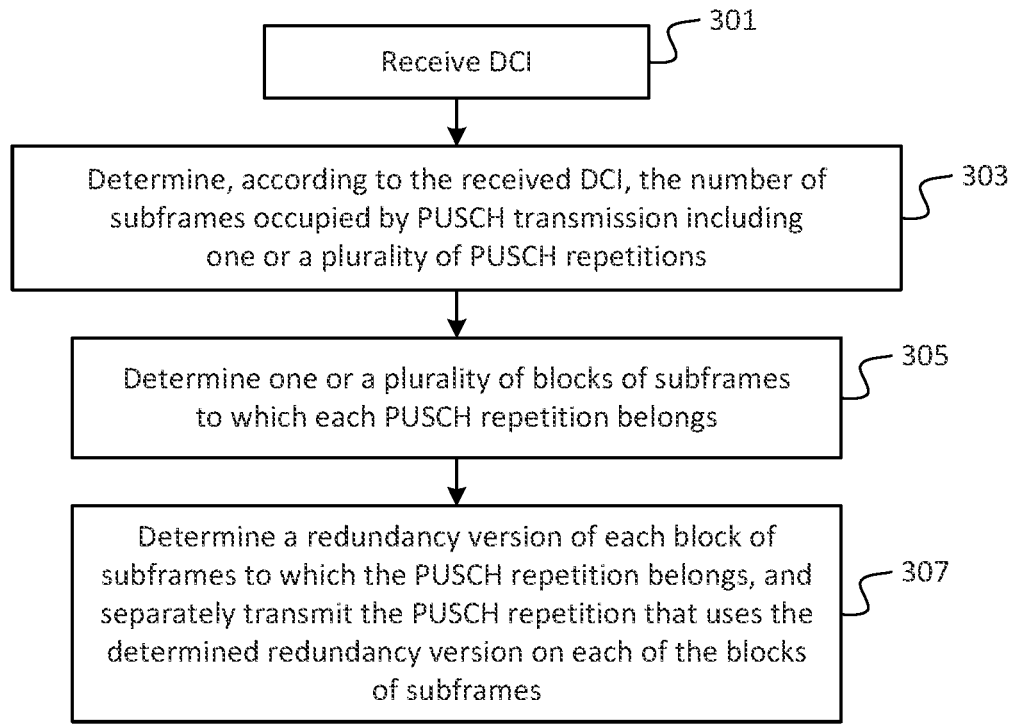
FIG. 3 illustrates a flowchart of a method executed by user equipment according to an embodiment of the present invention.

FIG. 3 illustrates a flowchart of a method executed by user equipment according to an embodiment of the present invention.

As illustrated in FIG. 3, steps executed by the user equipment (UE) include:

Step 301: receive downlink control information (DCI) from, for example, a base station.

Step 303: determine, according to the received DCI, the number N of subframes occupied by physical uplink shared channel (PUSCH) transmission including one or a plurality of PUSCH repetitions.

For example, a repetition number R, the number $N_{RU}$ of allocated resource units, and the number $N_t^{RU}$ of subframes occupied by each resource unit may be determined according to the DCI, and then N is calculated using the following equation:

$$N = R \cdot N_{RU} \cdot N_{RU}$$

Step 305: determine one or a plurality of blocks of subframes (having a length of $N_{acc}$) to which each PUSCH repetition belongs.

Step 307: determine a redundancy version of each block of subframes to which the PUSCH repetition belongs, and separately transmit the PUSCH repetition that uses the determined redundancy version on each of the blocks of subframes. The redundancy version may be determined using a method similar to the prior art method for determining a redundancy version of a block of PUSCH subframes of an MTC UE disclosed in the Background.

For example, if one PUSCH repetition occupies a total of 6 subframes {a, a+1, a+2, a+3, a+4, a+5}, where subframes {a, a+1} belong to a block of subframes x, and subframes {a+2, a+3, a+4, a+5} belong to a block of subframes x+1, the repetition is punctured and then transmitted on the subframes {a, a+1}, and a used redundancy version is determined based on the block of subframes x; in addition, the repetition is also punctured and then transmitted on the subframes {a+2, a+3, a+4, a+5}, and a used redundancy version is determined based on a block of subframes y.

Thus, transmission of PUSCH repetitions that use the corresponding redundancy version may be performed.

Embodiment 4

In an embodiment of the present invention, steps executed by user equipment (UE) are as follows:

1. receive from, for example, a base station downlink control information (DCI), which includes resource block allocation information (or resource block allocation indication); determine a starting resource block ($RB_{start}$) and a length ($L_{CRBs}$) of a group of consecutively allocated virtual resource blocks starting from the starting resource block via the resource block allocation information, where a reference PRB of $RB_{start}$, specifically a PRB corresponding to $RB_{start}=0$, is a PRB serially numbered as 0 in the system, specifically a PRB corresponding to $n_{PRB}=0$. In other words, $RB_{start}$ is a PRB serial number of the starting resource block in the system.

The resource block allocation information may occupy all bits in a "resource block assignment" field in the DCI, or may occupy some bits in the "Resource block assignment" field. For example, the total number of bits in the "resource block assignment" field may be $\lceil \log_2 \lfloor N_{RB}^{DL}/6 \rfloor \rceil + 5$, all used for indicating resource block allocation information.

Optionally, the DCI may include enable information for indicating whether to perform PDSCH resource allocation on the user equipment (UE) according to the method in the embodiment of the present invention. For example, the enable information may instruct the UE to interpret the content of the resource block allocation information according to the prior art or instruct the UE to interpret the content of the resource block allocation information according to the method in the embodiment of the present invention. Optionally, the enable information may be transmitted via a radio resource control (RRC) message rather than the DCI, or transmitted via both the RRC message and the DCI.

2. Determine $RB_{start}$ and $L_{CRBs}$.

The resource block allocation information includes a resource indication value (RIV), and the value of each RIV corresponds to an $RB_{start}$ and an $L_{CRBs}$.

Optionally, an integer value indicated by 5 least significant bits (LSBs) of the RIV is greater than 20.

Optionally, the PRB indicated by $RB_{start}$ belongs to a set formed by first PRBs of all RBGs in the system.

Optionally, the PRB indicated by $RB_{start}$ belongs to a set formed by last PRBs of all RBGs in the system.

Optionally, the PRB indicated by $RB_{start}$ belongs to a set formed by first PRBs of all RBGs in the system or a set formed by last PRBs of all RBGs in the system.

Optionally, $L_{CRBs}$ belongs to a subset of $\{1, 2, 3, 4, 5, 6\}$ or $\{1, 2, 3, 4, 5, 6\}$.

Optionally, at least one PRB in the allocated PRBs does not belong to any NB.

For example, one of the following methods may be used to determine the values of $RB_{start}$ and $L_{CRBs}$:

[Method 1 for determining values of $RB_{start}$ and $L_{CRBs}$]

First, RIV' is determined according to the following relationship between the RIV and an intermediate variable RIV':

$$RIV = \lfloor RIV'/X \rfloor \cdot Y + RIV' \bmod X + Z$$

where X, Y, and Z are positive integers, for example, X=11, Y=32, and Z=21.

Optionally, the relationship between the RIV and RIV' may be as follows:

$$RIV = RIV'$$

Second, $RB_{start}$ and $L_{CRBs}$ are determined according to a correspondence between RIV', $RB_{start}$, and $L_{CRBs}$. The values of $RB_{start}$ and $L_{CRBs}$ may be mapped to the value of RIV' in a manner listed in a table.

For example, for $N_{RB}^{DL}=15$, mapping may be performed in the manner illustrated in Table 1.

For example, for $N_{RB}^{DL}=25$, mapping may be performed in the manner illustrated in Table 2.

For example, for $N_{RB}^{DL}=50$, mapping may be performed in the manner illustrated in Table 3.

For example, for $N_{RB}^{DL}=75$, mapping may be performed in the manner illustrated in Table 4.

For example, for $N_{RB}^{DL}=100$, mapping may be performed in the manner illustrated in Table 5.

TABLE 1

Mapping table from ($RB_{start}$, $L_{CRBs}$) to RIV' ($N_{RB}^{DL}=15$)

| RIV' | ($RB_{start}$, $L_{CRBs}$) |
| --- | --- |
| 0 | (0, 2) |
| 1 | (0, 3) |
| 2 | (0, 4) |
| 3 | (0, 5) |
| 4 | (0, 6) |
| 5 | (2, 6) |
| 6 | (3, 5) |
| 7 | (4, 4) |
| 8 | (4, 5) |
| 9 | (4, 6) |
| 10 | (5, 3) |
| 11 | (5, 5) |
| 12 | (6, 2) |
| 13 | (6, 3) |
| 14 | (6, 4) |
| 15 | (6, 5) |
| 16 | (6, 6) |
| 17 | (7, 3) |
| 18 | (7, 5) |
| 19 | (9, 6) |
| 20 | (10, 5) |
| 21 | (11, 4) |

TABLE 2

Mapping table from ($RB_{start}$, $L_{CRBs}$) to RIV' ($N_{RB}^{DL}$ = 25)

| RIV' | ($RB_{start}$, $L_{CRBs}$) |
|---|---|
| 0 | (2, 5) |
| 1 | (2, 6) |
| 2 | (3, 5) |
| 3 | (4, 3) |
| 4 | (4, 4) |
| 5 | (4, 5) |
| 6 | (4, 6) |
| 7 | (5, 3) |
| 8 | (5, 5) |
| 9 | (8, 5) |
| 10 | (8, 6) |
| 11 | (9, 5) |
| 12 | (10, 3) |
| 13 | (10, 4) |
| 14 | (10, 5) |
| 15 | (10, 6) |
| 16 | (11, 3) |
| 17 | (11, 5) |
| 18 | (12, 2) |
| 19 | (12, 3) |
| 20 | (12, 4) |
| 21 | (12, 5) |
| 22 | (12, 6) |
| 23 | (14, 6) |
| 24 | (15, 5) |
| 25 | (16, 4) |
| 26 | (16, 5) |
| 27 | (16, 6) |
| 28 | (17, 3) |
| 29 | (17, 5) |
| 30 | (18, 2) |
| 31 | (18, 3) |
| 32 | (18, 4) |
| 33 | (18, 5) |
| 34 | (18, 6) |

TABLE 3

Mapping table from ($RB_{start}$, $L_{CRBs}$) to RIV' ($N_{RB}^{DL}$ = 50)

| RIV' | ($RB_{start}$, $L_{CRBs}$) |
|---|---|
| 0 | (0, 2) |
| 1 | (0, 3) |
| 2 | (0, 4) |
| 3 | (0, 5) |
| 4 | (0, 6) |
| 5 | (3, 5) |
| 6 | (3, 6) |
| 7 | (4, 5) |
| 8 | (5, 4) |
| 9 | (6, 2) |
| 10 | (6, 3) |
| 11 | (6, 4) |
| 12 | (6, 5) |
| 13 | (6, 6) |
| 14 | (9, 5) |
| 15 | (9, 6) |
| 16 | (10, 5) |
| 17 | (11, 4) |
| 18 | (12, 2) |
| 19 | (12, 3) |
| 20 | (12, 4) |
| 21 | (12, 5) |
| 22 | (12, 6) |
| 23 | (15, 5) |
| 24 | (15, 6) |
| 25 | (16, 5) |
| 26 | (17, 4) |
| 27 | (18, 2) |
| 28 | (18, 3) |

TABLE 3-continued

Mapping table from ($RB_{start}$, $L_{CRBs}$) to RIV' ($N_{RB}^{DL}$ = 50)

| RIV' | ($RB_{start}$, $L_{CRBs}$) |
|---|---|
| 29 | (18, 4) |
| 30 | (18, 5) |
| 31 | (18, 6) |
| 32 | (21, 5) |
| 33 | (21, 6) |
| 34 | (22, 5) |
| 35 | (23, 4) |
| 36 | (24, 2) |
| 37 | (24, 3) |
| 38 | (24, 4) |
| 39 | (24, 5) |
| 40 | (24, 6) |
| 41 | (27, 5) |
| 42 | (27, 6) |
| 43 | (28, 5) |
| 44 | (29, 4) |
| 45 | (30, 2) |
| 46 | (30, 3) |
| 47 | (30, 4) |
| 48 | (30, 5) |
| 49 | (30, 6) |
| 50 | (33, 5) |
| 51 | (33, 6) |
| 52 | (34, 5) |
| 53 | (35, 4) |
| 54 | (36, 2) |
| 55 | (36, 3) |
| 56 | (36, 4) |
| 57 | (36, 5) |
| 58 | (36, 6) |
| 59 | (39, 5) |
| 60 | (39, 6) |
| 61 | (40, 5) |
| 62 | (41, 4) |
| 63 | (42, 2) |
| 64 | (42, 3) |
| 65 | (42, 4) |
| 66 | (42, 5) |
| 67 | (42, 6) |
| 68 | (44, 6) |
| 69 | (45, 5) |
| 70 | (46, 4) |
| 71 | (47, 3) |
| 72 | (48, 2) |

TABLE 4

Mapping table from ($RB_{start}$, $L_{CRBs}$) to RIV' ($N_{RB}^{DL}$ = 75)

| RIV' | ($RB_{start}$, $L_{CRBs}$) |
|---|---|
| 0 | (0, 2) |
| 1 | (0, 3) |
| 2 | (0, 4) |
| 3 | (0, 5) |
| 4 | (0, 6) |
| 5 | (2, 6) |
| 6 | (3, 5) |
| 7 | (4, 4) |
| 8 | (4, 5) |
| 9 | (4, 6) |
| 10 | (5, 3) |
| 11 | (6, 2) |
| 12 | (6, 6) |
| 13 | (8, 6) |
| 14 | (10, 6) |
| 15 | (11, 5) |
| 16 | (12, 2) |
| 17 | (12, 3) |
| 18 | (12, 4) |
| 19 | (12, 5) |

TABLE 4-continued

Mapping table from ($RB_{start}$, $L_{CRBs}$) to RIV' ($N_{RB}^{DL} = 75$)

| RIV' | ($RB_{start}$, $L_{CRBs}$) |
|---|---|
| 20 | (12, 6) |
| 21 | (14, 6) |
| 22 | (15, 5) |
| 23 | (16, 4) |
| 24 | (16, 5) |
| 25 | (16, 6) |
| 26 | (17, 3) |
| 27 | (18, 2) |
| 28 | (18, 6) |
| 29 | (20, 6) |
| 30 | (22, 6) |
| 31 | (23, 5) |
| 32 | (24, 2) |
| 33 | (24, 3) |
| 34 | (24, 4) |
| 35 | (24, 5) |
| 36 | (24, 6) |
| 37 | (26, 6) |
| 38 | (27, 5) |
| 39 | (28, 4) |
| 40 | (28, 5) |
| 41 | (28, 6) |
| 42 | (29, 3) |
| 43 | (30, 2) |
| 44 | (30, 6) |
| 45 | (32, 6) |
| 46 | (34, 6) |
| 47 | (35, 5) |
| 48 | (36, 2) |
| 49 | (36, 3) |
| 50 | (36, 4) |
| 51 | (36, 5) |
| 52 | (36, 6) |
| 53 | (37, 3) |
| 54 | (40, 5) |
| 55 | (40, 6) |
| 56 | (42, 6) |
| 57 | (43, 5) |
| 58 | (46, 6) |
| 59 | (47, 5) |
| 60 | (48, 3) |
| 61 | (48, 4) |
| 62 | (48, 5) |
| 63 | (48, 6) |
| 64 | (49, 3) |
| 65 | (52, 5) |
| 66 | (52, 6) |
| 67 | (54, 6) |
| 68 | (55, 5) |
| 69 | (58, 6) |
| 70 | (59, 5) |
| 71 | (60, 3) |
| 72 | (60, 4) |
| 73 | (60, 5) |
| 74 | (60, 6) |
| 75 | (61, 3) |
| 76 | (64, 5) |
| 77 | (64, 6) |
| 78 | (66, 6) |
| 79 | (67, 5) |
| 80 | (69, 6) |
| 81 | (70, 5) |
| 82 | (71, 4) |
| 83 | (72, 3) |
| 84 | (73, 2) |

TABLE 5

Mapping table from ($RB_{start}$, $L_{CRBs}$) to RIV' ($N_{RB}^{DL} = 100$)

| RIV' | ($RB_{start}$, $L_{CRBs}$) |
|---|---|
| 0 | (0, 2) |
| 1 | (0, 3) |
| 2 | (0, 4) |
| 3 | (0, 5) |
| 4 | (0, 6) |
| 5 | (1, 3) |
| 6 | (4, 5) |
| 7 | (4, 6) |
| 8 | (6, 6) |
| 9 | (7, 5) |
| 10 | (10, 6) |
| 11 | (11, 5) |
| 12 | (12, 3) |
| 13 | (12, 4) |
| 14 | (12, 5) |
| 15 | (12, 6) |
| 16 | (13, 3) |
| 17 | (16, 5) |
| 18 | (16, 6) |
| 19 | (18, 6) |
| 20 | (19, 5) |
| 21 | (22, 6) |
| 22 | (23, 5) |
| 23 | (24, 3) |
| 24 | (24, 4) |
| 25 | (24, 5) |
| 26 | (24, 6) |
| 27 | (25, 3) |
| 28 | (28, 5) |
| 29 | (28, 6) |
| 30 | (30, 6) |
| 31 | (31, 5) |
| 32 | (34, 6) |
| 33 | (35, 5) |
| 34 | (36, 3) |
| 35 | (36, 4) |
| 36 | (36, 5) |
| 37 | (36, 6) |
| 38 | (37, 3) |
| 39 | (40, 5) |
| 40 | (40, 6) |
| 41 | (42, 6) |
| 42 | (43, 5) |
| 43 | (46, 6) |
| 44 | (47, 5) |
| 45 | (48, 3) |
| 46 | (48, 4) |
| 47 | (48, 5) |
| 48 | (48, 6) |
| 49 | (49, 3) |
| 50 | (52, 5) |
| 51 | (52, 6) |
| 52 | (54, 6) |
| 53 | (55, 5) |
| 54 | (58, 6) |
| 55 | (59, 5) |
| 56 | (60, 3) |
| 57 | (60, 4) |
| 58 | (60, 5) |
| 59 | (60, 6) |
| 60 | (61, 3) |
| 61 | (64, 5) |
| 62 | (64, 6) |
| 63 | (66, 6) |
| 64 | (67, 5) |
| 65 | (70, 6) |
| 66 | (71, 5) |
| 67 | (72, 3) |
| 68 | (72, 4) |
| 69 | (72, 5) |
| 70 | (72, 6) |
| 71 | (73, 3) |
| 72 | (76, 5) |
| 73 | (76, 6) |
| 74 | (78, 6) |

TABLE 5-continued

Mapping table from ($RB_{start}$, $L_{CRBs}$) to RIV' ($N_{RB}^{DL}$ = 100)

| RIV' | ($RB_{start}$, $L_{CRBs}$) |
|---|---|
| 75 | (79, 5) |
| 76 | (82, 6) |
| 77 | (83, 5) |
| 78 | (84, 3) |
| 79 | (84, 4) |
| 80 | (84, 5) |
| 81 | (84, 6) |
| 82 | (85, 3) |
| 83 | (88, 5) |
| 84 | (88, 6) |
| 85 | (90, 6) |
| 86 | (91, 5) |
| 87 | (94, 6) |
| 88 | (95, 5) |
| 89 | (96, 3) |
| 90 | (96, 4) |
| 91 | (97, 3) |
| 92 | (98, 2) |

It is to be noted that any of Table 1, Table 2, Table 3, Table 4, and Table 5 is merely a manner for implementing mapping from ($RB_{start}$, $L_{CRBs}$) to RIV'. For any of these tables, the mapping relationship from ($RB_{start}$, $L_{CRBs}$) to RIV' may be arbitrarily changed as long as value sets of both RIV' and ($RB_{start}$, $L_{CRBs}$) are kept unchanged and the value of each RIV' corresponds to a unique value of ($RB_{start}$, $L_{CRBs}$).

Optionally, any of Table 1, Table 2, Table 3, Table 4, and Table 5 may define only ($RB_{start}$, $L_{CRBs}$) items where $L_{CRBs}$ and/or $RB_{start}$ satisfies specific value conditions, and not define other ($RB_{start}$, $L_{CRBs}$) items. At this time, RIV' corresponding to each ($RB_{start}$, $L_{CRBs}$) item can still be allocated from smallest to largest starting from the minimum value of RIV' in the corresponding table. For example, in Table 1, if the value range set of $L_{CRBs}$ is {6}, the table may define only items with (0, 6), (2, 6), (4, 6), (6, 6), (9, 6) as ($RB_{start}$, $L_{CRBs}$) values, and values of RIV' corresponding thereto may be 0, 1, 2, 3, and 4.

[Method 2 for Determining Values of $RB_{start}$ and $L_{CRBs}$]

The values of $RB_{start}$ and $L_{CRBs}$ may be mapped to the value of RIV in a manner listed in a table.

For example, for $N_{RB}^{DL}$=15, mapping may be performed in the manner illustrated in Table 6.

For example, for $N_{RB}^{DL}$=25, mapping may be performed in the manner illustrated in Table 7.

For example, for $N_{RB}^{DL}$=50, mapping may be performed in the manner illustrated in Table 8.

For example, for $N_{RB}^{DL}$=75, mapping may be performed in the manner illustrated in Table 9.

For example, for $N_{RB}^{DL}$=100, mapping may be performed in the manner illustrated in Table 10.

TABLE 6

Mapping table from ($RB_{start}$, $L_{CRBs}$) to RIV ($N_{RB}^{DL}$ = 15)

| RIV | ($RB_{start}$, $L_{CRBs}$) |
|---|---|
| 21 | (0, 2) |
| 22 | (0, 3) |
| 23 | (0, 4) |
| 24 | (0, 5) |
| 25 | (0, 6) |
| 26 | (2, 6) |
| 27 | (3, 5) |
| 28 | (4, 4) |

TABLE 6-continued

Mapping table from ($RB_{start}$, $L_{CRBs}$) to RIV ($N_{RB}^{DL}$ = 15)

| RIV | ($RB_{start}$, $L_{CRBs}$) |
|---|---|
| 29 | (4, 5) |
| 30 | (4, 6) |
| 31 | (5, 3) |
| 53 | (5, 5) |
| 54 | (6, 2) |
| 55 | (6, 3) |
| 56 | (6, 4) |
| 57 | (6, 5) |
| 58 | (6, 6) |
| 59 | (7, 3) |
| 60 | (7, 5) |
| 61 | (9, 6) |
| 62 | (10, 5) |
| 63 | (11, 4) |

TABLE 7

Mapping table from ($RB_{start}$, $L_{CRBs}$) to RIV ($N_{RB}^{DL}$ = 25)

| RIV | ($RB_{start}$, $L_{CRBs}$) |
|---|---|
| 21 | (2, 5) |
| 22 | (2, 6) |
| 23 | (3, 5) |
| 24 | (4, 3) |
| 25 | (4, 4) |
| 26 | (4, 5) |
| 27 | (4, 6) |
| 28 | (5, 3) |
| 29 | (5, 5) |
| 30 | (8, 5) |
| 31 | (8, 6) |
| 53 | (9, 5) |
| 54 | (10, 3) |
| 55 | (10, 4) |
| 56 | (10, 5) |
| 57 | (10, 6) |
| 58 | (11, 3) |
| 59 | (11, 5) |
| 60 | (12, 2) |
| 61 | (12, 3) |
| 62 | (12, 4) |
| 63 | (12, 5) |
| 85 | (12, 6) |
| 86 | (14, 6) |
| 87 | (15, 5) |
| 88 | (16, 4) |
| 89 | (16, 5) |
| 90 | (16, 6) |
| 91 | (17, 3) |
| 92 | (17, 5) |
| 93 | (18, 2) |
| 94 | (18, 3) |
| 95 | (18, 4) |
| 117 | (18, 5) |
| 118 | (18, 6) |

TABLE 8

Mapping table from ($RB_{start}$, $L_{CRBs}$) to RIV ($N_{RB}^{DL}$ = 50)

| RIV | ($RB_{start}$, $L_{CRBs}$) |
|---|---|
| 21 | (0, 2) |
| 22 | (0, 3) |
| 23 | (0, 4) |
| 24 | (0, 5) |
| 25 | (0, 6) |

TABLE 8-continued

Mapping table from ($RB_{start}$, $L_{CRBs}$) to RIV ($N_{RB}^{DL}$ = 50)

| RIV | ($RB_{start}$, $L_{CRBs}$) |
|---|---|
| 26 | (3, 5) |
| 27 | (3, 6) |
| 28 | (4, 5) |
| 29 | (5, 4) |
| 30 | (6, 2) |
| 31 | (6, 3) |
| 53 | (6, 4) |
| 54 | (6, 5) |
| 55 | (6, 6) |
| 56 | (9, 5) |
| 57 | (9, 6) |
| 58 | (10, 5) |
| 59 | (11, 4) |
| 60 | (12, 2) |
| 61 | (12, 3) |
| 62 | (12, 4) |
| 63 | (12, 5) |
| 85 | (12, 6) |
| 86 | (15, 5) |
| 87 | (15, 6) |
| 88 | (16, 5) |
| 89 | (17, 4) |
| 90 | (18, 2) |
| 91 | (18, 3) |
| 92 | (18, 4) |
| 93 | (18, 5) |
| 94 | (18, 6) |
| 95 | (21, 5) |
| 117 | (21, 6) |
| 118 | (22, 5) |
| 119 | (23, 4) |
| 120 | (24, 2) |
| 121 | (24, 3) |
| 122 | (24, 4) |
| 123 | (24, 5) |
| 124 | (24, 6) |
| 125 | (27, 5) |
| 126 | (27, 6) |
| 127 | (28, 5) |
| 149 | (29, 4) |
| 150 | (30, 2) |
| 151 | (30, 3) |
| 152 | (30, 4) |
| 153 | (30, 5) |
| 154 | (30, 6) |
| 155 | (33, 5) |
| 156 | (33, 6) |
| 157 | (34, 5) |
| 158 | (35, 4) |
| 159 | (36, 2) |
| 181 | (36, 3) |
| 182 | (36, 4) |
| 183 | (36, 5) |
| 184 | (36, 6) |
| 185 | (39, 5) |
| 186 | (39, 6) |
| 187 | (40, 5) |
| 188 | (41, 4) |
| 189 | (42, 2) |
| 190 | (42, 3) |
| 191 | (42, 4) |
| 213 | (42, 5) |
| 214 | (42, 6) |
| 215 | (44, 6) |
| 216 | (45, 5) |
| 217 | (46, 4) |
| 218 | (47, 3) |
| 219 | (48, 2) |

TABLE 9

Mapping table from ($RB_{start}$, $L_{CRBs}$) to RIV ($N_{RB}^{DL}$ = 75)

| RIV | ($RB_{start}$, $L_{CRBs}$) |
|---|---|
| 21 | (0, 2) |
| 22 | (0, 3) |
| 23 | (0, 4) |
| 24 | (0, 5) |
| 25 | (0, 6) |
| 26 | (2, 6) |
| 27 | (3, 5) |
| 28 | (4, 4) |
| 29 | (4, 5) |
| 30 | (4, 6) |
| 31 | (5, 3) |
| 53 | (6, 2) |
| 54 | (6, 6) |
| 55 | (8, 6) |
| 56 | (10, 6) |
| 57 | (11, 5) |
| 58 | (12, 2) |
| 59 | (12, 3) |
| 60 | (12, 4) |
| 61 | (12, 5) |
| 62 | (12, 6) |
| 63 | (14, 6) |
| 85 | (15, 5) |
| 86 | (16, 4) |
| 87 | (16, 5) |
| 88 | (16, 6) |
| 89 | (17, 3) |
| 90 | (18, 2) |
| 91 | (18, 6) |
| 92 | (20, 6) |
| 93 | (22, 6) |
| 94 | (23, 5) |
| 95 | (24, 2) |
| 117 | (24, 3) |
| 118 | (24, 4) |
| 119 | (24, 5) |
| 120 | (24, 6) |
| 121 | (26, 6) |
| 122 | (27, 5) |
| 123 | (28, 4) |
| 124 | (28, 5) |
| 125 | (28, 6) |
| 126 | (29, 3) |
| 127 | (30, 2) |
| 149 | (30, 6) |
| 150 | (32, 6) |
| 151 | (34, 6) |
| 152 | (35, 5) |
| 153 | (36, 2) |
| 154 | (36, 3) |
| 155 | (36, 4) |
| 156 | (36, 5) |
| 157 | (36, 6) |
| 158 | (37, 3) |
| 159 | (40, 5) |
| 181 | (40, 6) |
| 182 | (42, 6) |
| 183 | (43, 5) |
| 184 | (46, 6) |
| 185 | (47, 5) |
| 186 | (48, 3) |
| 187 | (48, 4) |
| 188 | (48, 5) |
| 189 | (48, 6) |
| 190 | (49, 3) |
| 191 | (52, 5) |
| 213 | (52, 6) |
| 214 | (54, 6) |
| 215 | (55, 5) |
| 216 | (58, 6) |
| 217 | (59, 5) |
| 218 | (60, 3) |
| 219 | (60, 4) |
| 220 | (60, 5) |
| 221 | (60, 6) |

TABLE 9-continued

Mapping table from ($RB_{start}$, $L_{CRBs}$) to RIV ($N_{RB}^{DL} = 75$)

| RIV | ($RB_{start}$, $L_{CRBs}$) |
|---|---|
| 222 | (61, 3) |
| 223 | (64, 5) |
| 245 | (64, 6) |
| 246 | (66, 6) |
| 247 | (67, 5) |
| 248 | (69, 6) |
| 249 | (70, 5) |
| 250 | (71, 4) |
| 251 | (72, 3) |
| 252 | (73, 2) |

TABLE 10

Mapping table from ($RB_{start}$, $L_{CRBs}$) to RIV ($N_{RB}^{DL} = 100$)

| RIV | ($RB_{start}$, $L_{CRBs}$) |
|---|---|
| 21 | (0, 2) |
| 22 | (0, 3) |
| 23 | (0, 4) |
| 24 | (0, 5) |
| 25 | (0, 6) |
| 26 | (1, 3) |
| 27 | (4, 5) |
| 28 | (4, 6) |
| 29 | (6, 6) |
| 30 | (7, 5) |
| 31 | (10, 6) |
| 53 | (11, 5) |
| 54 | (12, 3) |
| 55 | (12, 4) |
| 56 | (12, 5) |
| 57 | (12, 6) |
| 58 | (13, 3) |
| 59 | (16, 5) |
| 60 | (16, 6) |
| 61 | (18, 6) |
| 62 | (19, 5) |
| 63 | (22, 6) |
| 85 | (23, 5) |
| 86 | (24, 3) |
| 87 | (24, 4) |
| 88 | (24, 5) |
| 89 | (24, 6) |
| 90 | (25, 3) |
| 91 | (28, 5) |
| 92 | (28, 6) |
| 93 | (30, 6) |
| 94 | (31, 5) |
| 95 | (34, 6) |
| 117 | (35, 5) |
| 118 | (36, 3) |
| 119 | (36, 4) |
| 120 | (36, 5) |
| 121 | (36, 6) |
| 122 | (37, 3) |
| 123 | (40, 5) |
| 124 | (40, 6) |
| 125 | (42, 6) |
| 126 | (43, 5) |
| 127 | (46, 6) |
| 149 | (47, 5) |
| 150 | (48, 3) |
| 151 | (48, 4) |
| 152 | (48, 5) |
| 153 | (48, 6) |
| 154 | (49, 3) |
| 155 | (52, 5) |
| 156 | (52, 6) |
| 157 | (54, 6) |
| 158 | (55, 5) |

TABLE 10-continued

Mapping table from ($RB_{start}$, $L_{CRBs}$) to RIV ($N_{RB}^{DL} = 100$)

| RIV | ($RB_{start}$, $L_{CRBs}$) |
|---|---|
| 159 | (58, 6) |
| 181 | (59, 5) |
| 182 | (60, 3) |
| 183 | (60, 4) |
| 184 | (60, 5) |
| 185 | (60, 6) |
| 186 | (61, 3) |
| 187 | (64, 5) |
| 188 | (64, 6) |
| 189 | (66, 6) |
| 190 | (67, 5) |
| 191 | (70, 6) |
| 213 | (71, 5) |
| 214 | (72, 3) |
| 215 | (72, 4) |
| 216 | (72, 5) |
| 217 | (72, 6) |
| 218 | (73, 3) |
| 219 | (76, 5) |
| 220 | (76, 6) |
| 221 | (78, 6) |
| 222 | (79, 5) |
| 223 | (82, 6) |
| 245 | (83, 5) |
| 246 | (84, 3) |
| 247 | (84, 4) |
| 248 | (84, 5) |
| 249 | (84, 6) |
| 250 | (85, 3) |
| 251 | (88, 5) |
| 252 | (88, 6) |
| 253 | (90, 6) |
| 254 | (91, 5) |
| 255 | (94, 6) |
| 277 | (95, 5) |
| 278 | (96, 3) |
| 279 | (96, 4) |
| 280 | (97, 3) |
| 281 | (98, 2) |

It is to be noted that any of Table 6, Table 7, Table 8, Table 9, and Table 10 is merely a manner for implementing mapping from ($RB_{start}$, $L_{CRBs}$) to RIV. For any of these tables, the mapping relationship from ($RB_{start}$, $L_{CRBs}$) to RIV may be arbitrarily changed as long as value sets of both RIV and ($RB_{start}$, $L_{CRSs}$) are kept unchanged and the value of each RIV corresponds to a unique value of ($RB_{start}$, $L_{CRBs}$) ($L_{CRBs}$, $RB_{start}$).

Optionally, any of Table 6, Table 7, Table 8, Table 9, and Table 10 may define only ($RB_{start}$, $L_{CRBs}$) items where $L_{CRBs}$ and/or $RB_{start}$ satisfies specific value conditions, and not define other ($RB_{start}$, $L_{CRBs}$) items; at this time, RIV corresponding to each ($RB_{start}$, $L_{CRBs}$) item can still be allocated from smallest to largest starting from the minimum value of RIV in the corresponding table. For example, in Table 6, if the value range set of $L_{CRBs}$ is {6}, the table may define only items with (0, 6), (2, 6), (4, 6), (6, 6), (9, 6) as ($RB_{start}$, $L_{CRBs}$) values, and values of RIV corresponding thereto may be 21, 22, 23, 24, and 25.

3. Receive a PDSCH on virtual resource blocks determined by $RB_{start}$ and $L_{CRBs}$.

4. Optionally, in all the previously disclosed steps, $B_{VRB}^{DL}$ may also be replaced with $N_{RB}^{DL}$, the virtual resource blocks may also be replaced with physical resource blocks, and the user equipment (UE) may be a non-MTC UE or an MTC UE.

Figure 4:
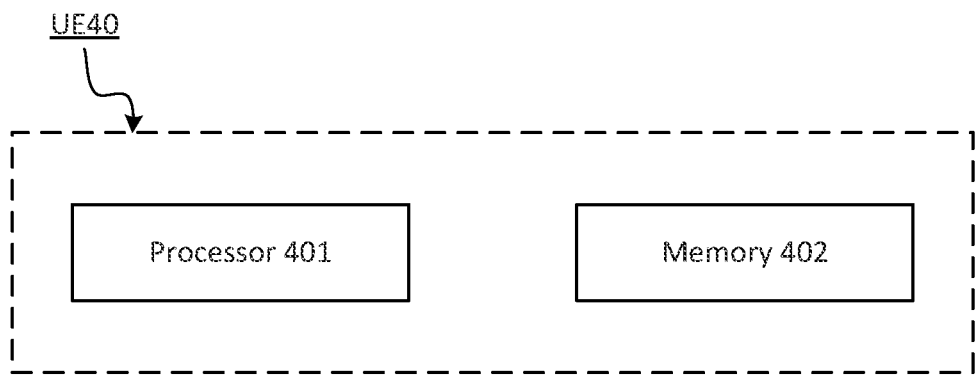
FIG. 4 illustrates a block diagram of user equipment (UE) according to an embodiment of the present invention.

FIG. 4 illustrates a block diagram of user equipment (UE) according to an embodiment of the present invention. As illustrated in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or another memory. The memory 402 stores program instructions. When executed by the processor 401, the instructions perform the previously disclosed method.

The program running in the device according to the present invention may be a program that enables a computer to implement the functions of the embodiments of the present invention by controlling a central processing unit (CPU). The program or information processed by the program may be temporarily stored in a volatile memory (such as a random access memory (RAM)), a hard disk drive (HDD), a non-volatile memory (such as a flash memory), or another memory system.

Programs for executing the various disclosed embodiments of the present invention may be recorded in a computer-readable recording medium. Corresponding functions may be executed by causing a computer system to read the programs recorded in the recording medium and execute these programs. The so-called "computer system" here may be a computer system embedded in the device, and may include an operating system or hardware (such as peripheral devices). The "computer-readable recording medium" may be a semiconductor recording medium, an optical recording medium, a magnetic recording medium, a recording medium storing a program dynamically for a short time, or any other recording medium readable by a computer.

Various features or functional modules of the devices used in the previously disclosed embodiments may be implemented or executed by circuits (such as single-chip or multi-chip integrated circuits). Circuits designed to execute the functions described in this specification may include a general-purpose processor, a digital signal processor (DSP), an application-specific integrated circuit (ASIC), a field programmable gate array (FPGA), or another programmable logic device, a discrete gate or transistor logic, a discrete hardware component, or any combination of the above devices. The general-purpose processor may be a microprocessor, or any existing processor, controller, microcontroller, or state machine. The above circuit may be a digital circuit or an analog circuit. In the case of new integrated circuit technologies that replace existing integrated circuits because of advancements in the semiconductor technologies, one or a plurality of embodiments of the present invention may also be implemented using these new integrated circuit technologies.

In addition, the present invention is not limited to the previously disclosed embodiments. Various examples of the embodiments have been disclosed; however, the present invention is not limited thereto. Fixed or non-mobile electronic devices mounted indoors or outdoors may be used as terminal devices or communication devices, such as AV devices, kitchen devices, cleaning devices, air conditioners, office devices, vending machines, and other household appliances.

The embodiments of the present invention have been disclosed in detail with reference to the accompanying drawings. However, the specific structure is not limited to the disclosed embodiments, and the present invention also includes any design changes that do not deviate from the gist of the present invention. In addition, various modifications may be made to the present invention within the scope of the claims, and embodiments obtained by appropriately combining the technical means disclosed in different embodiments are also included in the technical scope of the present invention. In addition, the components having the same effects in the disclosed embodiments may be substituted for each other.

The invention claimed is:

1. A method executed by a user equipment (UE), the method comprising:
    receiving downlink control information (DCI);
    determining, according to the DCI, a number of subframes occupied by a physical uplink shared channel (PUSCH) transmission comprising one or more PUSCH repetitions;
    dividing the one or more PUSCH repetitions into one or more blocks of PUSCH repetitions; and
    determining a redundancy version index for each of the one or more blocks of PUSCH repetitions, a redundancy version corresponding to the determined redundancy version index being applied to all PUSCH repetitions within each of the one or more blocks of PUSCH repetitions,
    wherein each of the one or more blocks of PUSCH repetitions comprises at least one PUSCH repetition.

2. The method according to claim 1, wherein each of the one or more PUSCH repetitions is allocated with one or more resource units, each of the one or more resource units occupying one or more subframes.

3. The method according to claim 2, wherein the number of subframes occupied by the PUSCH transmission is determined according to a number of the one or more PUSCH repetitions, a number of resource units allocated to each of the one or more PUSCH repetitions, and a number of subframes occupied by each of the one or more resource units.

4. The method according to claim 1, wherein the redundancy version index of each of the one or more blocks of PUSCH repetitions is determined according to a serial number of a corresponding block of the one or more blocks of PUSCH repetitions.

5. The method according to claim 1, wherein determining the redundancy version index for each of the one or more blocks of PUSCH repetitions comprises:
    determining a reference subframe for each of the one or more blocks of PUSCH repetitions; and
    determining a redundancy version index for the reference subframe for each of the one or more blocks of PUSCH repetitions to serve as the redundancy version index of a corresponding block of the one or more blocks of PUSCH repetitions in which the reference subframe is located.

6. The method according to claim 1, wherein:
    each of the one or more PUSCH repetitions is allocated with one or more resource units; and
    each of the one or more resource units occupies one or more subframes.

7. The method according to claim 6, wherein the number of subframes occupied by the PUSCH transmission is determined according to a number of the one or more PUSCH repetitions, a number of resource units allocated to each of the one or more PUSCH repetitions, and a number of subframes occupied by each of the one or more resource units.

8. The method according to claim 5, wherein the redundancy version index of the reference subframe for each of the one or more blocks of PUSCH transmissions is determined according to a serial number of a corresponding block of subframes in which the reference subframe is located.

9. A user equipment (UE), comprising:
    at least one processor; and
    at least one memory coupled to the at least one processor and storing computer-readable instructions that, when executed by the at least one processor, cause the UE to perform operations comprising:
    receiving downlink control information (DCI);
    determining, according to the DCI, a number of subframes occupied by a physical uplink shared channel (PUSCH) transmission comprising one or more PUSCH repetitions;
    dividing the one or more PUSCH repetitions into one or more blocks of PUSCH repetitions; and
    determining a redundancy version index for each of the one or more blocks of PUSCH repetitions, a redundancy version corresponding to the determined redundancy version index being applied to all PUSCH repetitions within each of the one or more blocks of PUSCH repetitions,
    wherein each of the one or more blocks of PUSCH repetitions comprises at least one PUSCH repetition.

10. The UE according to claim 9, wherein each of the one or more PUSCH repetitions is allocated with one or more resource units, each of the one or more resource units occupying one or more subframes.

11. The UE according to claim 10, wherein the number of subframes occupied by the PUSCH transmission is determined according to a number of the one or more PUSCH repetitions, a number of resource units allocated to each of the one or more PUSCH repetitions, and a number of subframes occupied by each of the one or more resource units.

12. The UE according to claim 9, wherein the redundancy version index of each of the one or more blocks of PUSCH repetitions is determined according to a serial number of a corresponding block of the one or more blocks of PUSCH repetitions.

13. The UE according to claim 9, wherein determining the redundancy version index for each of the one or more blocks of PUSCH repetitions comprises:
    determining a reference subframe for each of the one or more blocks of PUSCH repetitions; and
    determining a redundancy version index for the reference subframe for each of the one or more blocks of PUSCH repetitions to serve as the redundancy version index of a corresponding block of the one or more blocks of PUSCH repetitions in which the reference subframe is located.

14. The UE according to claim 9, wherein:
    each of the one or more PUSCH repetitions is allocated with one or more resource units; and
    each of the one or more resource units occupies one or more subframes.

15. The UE according to claim 14, wherein the number of subframes occupied by the PUSCH transmission is determined according to a number of the one or more PUSCH repetitions, a number of resource units allocated to each of the one or more PUSCH repetitions, and a number of subframes occupied by each of the one or more resource units.

16. The UE according to claim 13, wherein the redundancy version index of the reference subframe for each of the one or more blocks of PUSCH transmissions is determined according to a serial number of a corresponding block of subframes in which the reference subframe is located.

* * * * *